No. 744,240. PATENTED NOV. 17, 1903.
W. ROSSETTER & R. TALBOT.
WEFT REPLENISHING LOOM.
APPLICATION FILED DEC. 8, 1902.
NO MODEL. 5 SHEETS—SHEET 1.

No. 744,240. PATENTED NOV. 17, 1903.
W. ROSSETTER & R. TALBOT.
WEFT REPLENISHING LOOM.
APPLICATION FILED DEC. 8, 1902.
NO MODEL. 5 SHEETS—SHEET 2.

WITNESSES
H. M. Kuehne
John A. Percival

INVENTORS
William Rossetter
Richard Talbot
BY Richardson
ATTORNEYS

No. 744,240. PATENTED NOV. 17, 1903.
W. ROSSETTER & R. TALBOT.
WEFT REPLENISHING LOOM.
APPLICATION FILED DEC. 8, 1902.
NO MODEL. 5 SHEETS—SHEET 3.

WITNESSES
H. M. Kuehne
John A. Percival

INVENTORS
William Rossetter
Richard Talbot
BY Richards
ATTORNEYS

No. 744,240. PATENTED NOV. 17, 1903.
W. ROSSETTER & R. TALBOT.
WEFT REPLENISHING LOOM.
APPLICATION FILED DEC. 8, 1902.
NO MODEL. 5 SHEETS—SHEET 4.
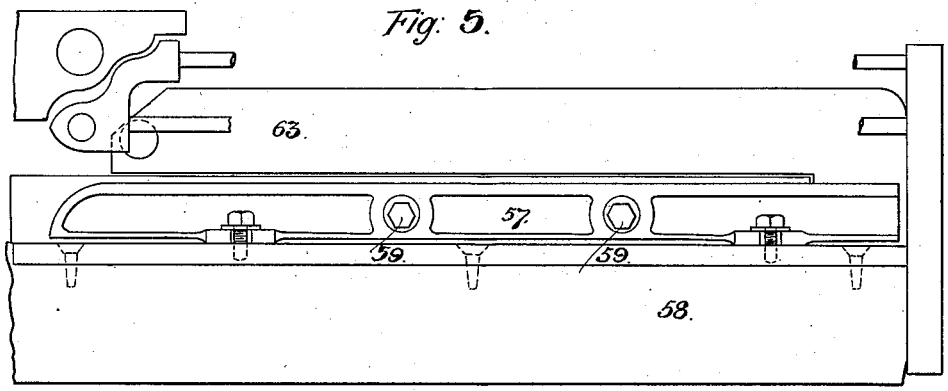
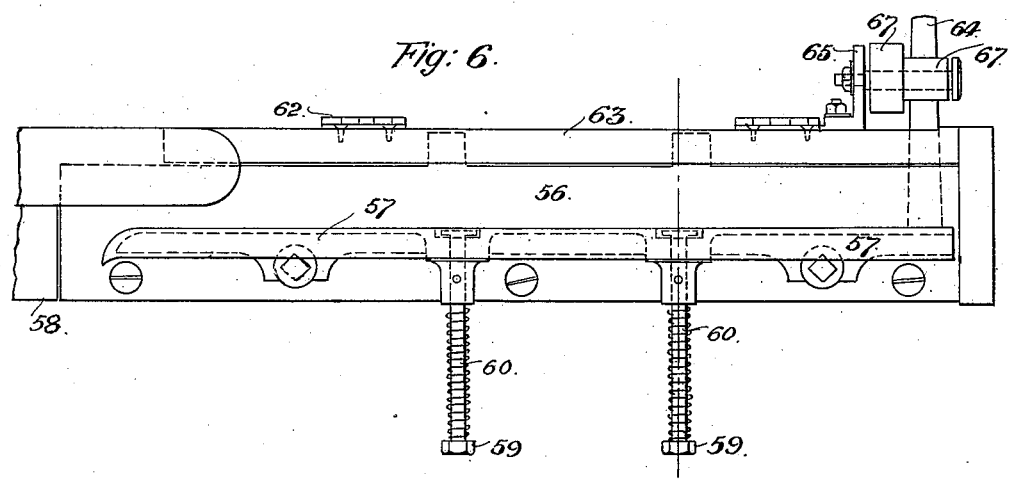
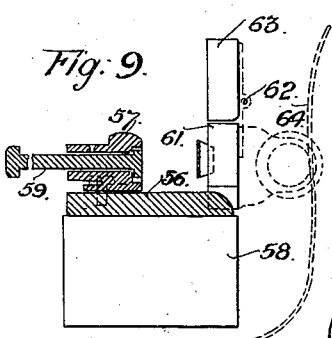
WITNESSES
H. M. Kuehne
John A. Percival
INVENTORS
William Rossetter
Richard Talbot
BY
ATTORNEYS No. 744,240. PATENTED NOV. 17, 1903.
W. ROSSETTER & R. TALBOT.
WEFT REPLENISHING LOOM.
APPLICATION FILED DEC. 8, 1902.
NO MODEL. 5 SHEETS—SHEET 5.
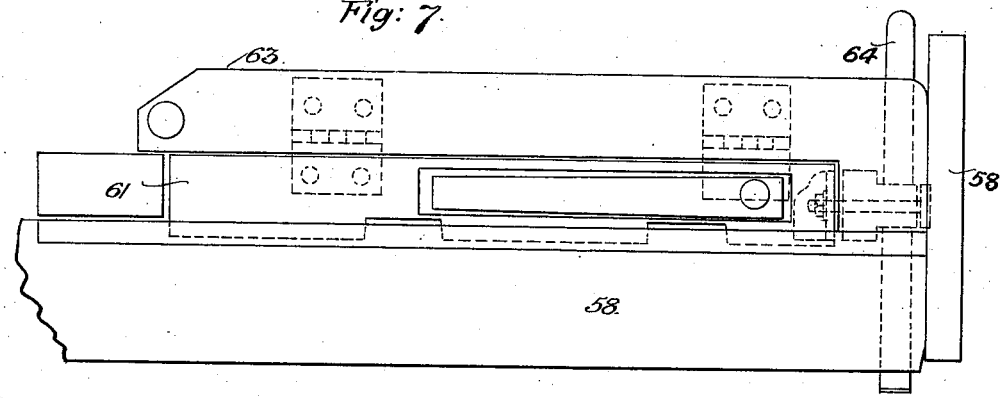
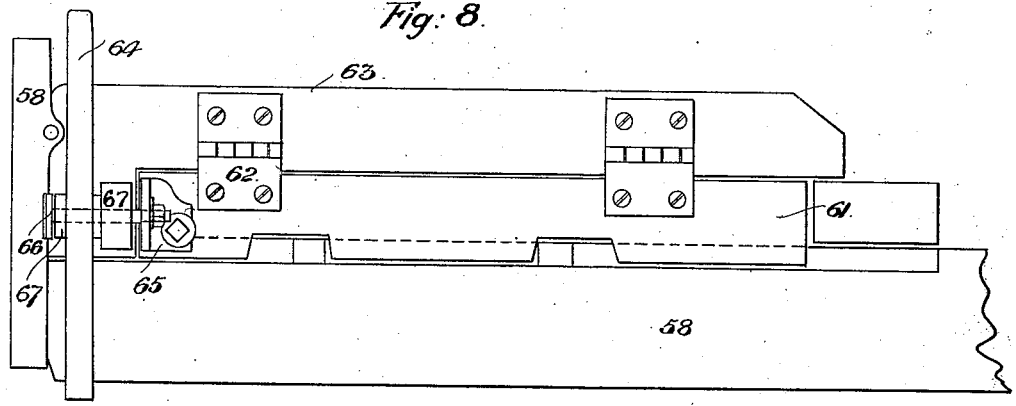

No. 744,240. Patented November 17, 1903.

UNITED STATES PATENT OFFICE.

WILLIAM ROSSETTER AND RICHARD TALBOT, OF BLACKBURN, ENGLAND.

WEFT-REPLENISHING LOOM.

SPECIFICATION forming part of Letters Patent No. 744,240, dated November 17, 1903.

Application filed December 8, 1902. Serial No. 134,432. (No model.)

*To all whom it may concern:*

Be it known that we, WILLIAM ROSSETTER, of 47 Hancock street, and RICHARD TALBOT, of 3 Hardman street, Blackburn, in the county of Lancaster, England, have invented a certain new and useful Weft-Replenishing Loom, of which the following is a specification.

Our invention relates to improvements in automatic shuttling-motions of looms for weaving; and our object is to construct a simple motion which will automatically effect the change of shuttle when required without stopping the loom, thereby obviating the necessity for additional brake-power, which is very undesirable and destructive.

In carrying out our invention we employ any suitable mechanism, but preferably an improved motion of our own invention, for giving a slow motion to the loom during the time that the shuttle-changing motion is in action to eject the spent shuttle while the lathe is on the front centers and to insert the full shuttle while the lathe is on the back centers. The loom is then started at full speed and has approximately three-quarters of a revolution of the crank-shaft in which to acquire sufficient momentum to insure the shuttle being driven across the shed at the first stroke of the picking-stick after the change.

Figure 1:
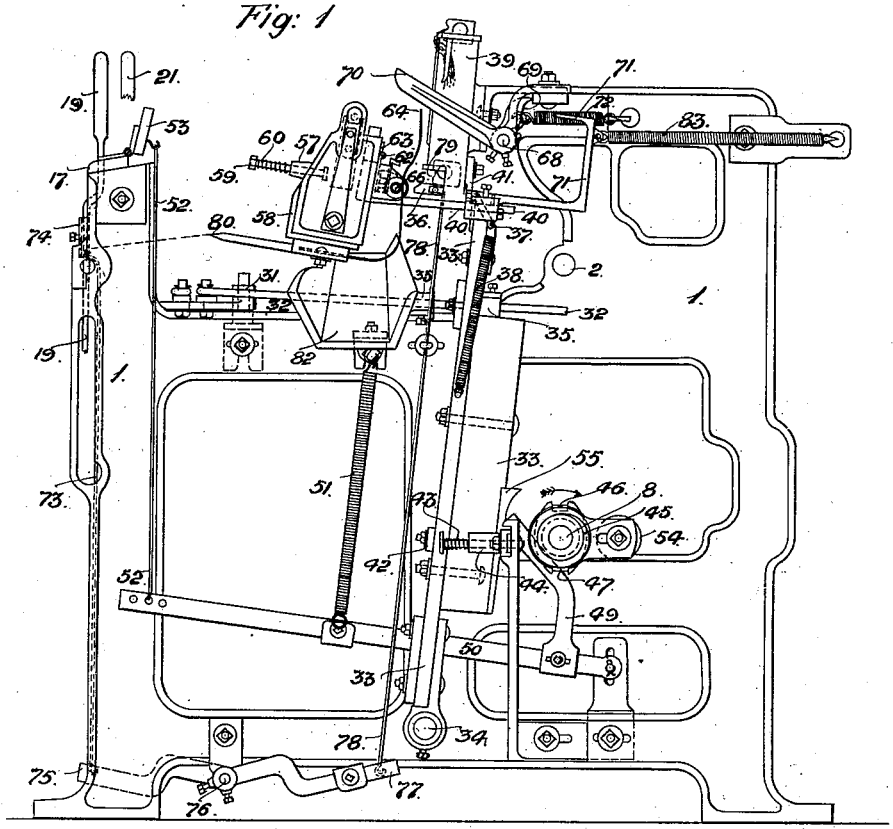
Figure 2:
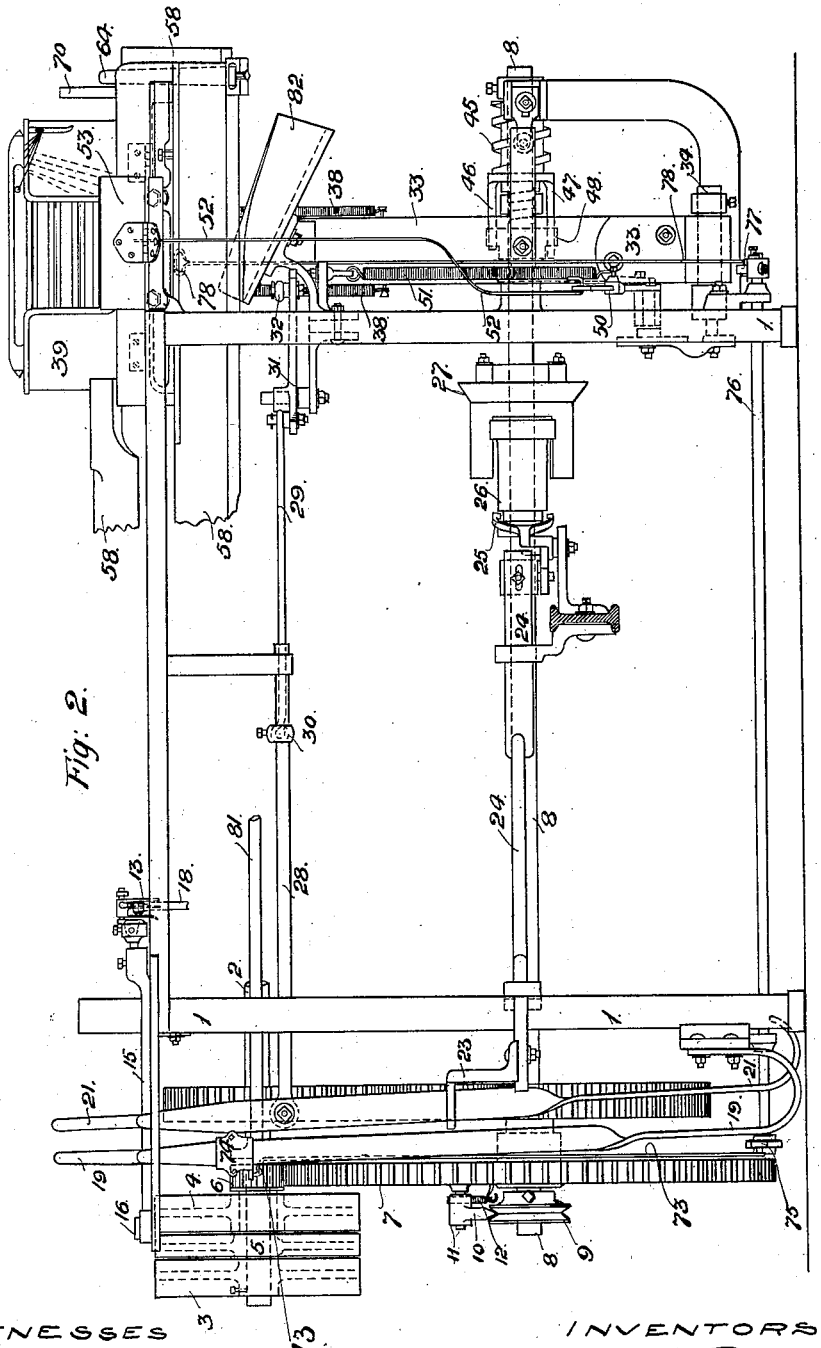
Figure 3:
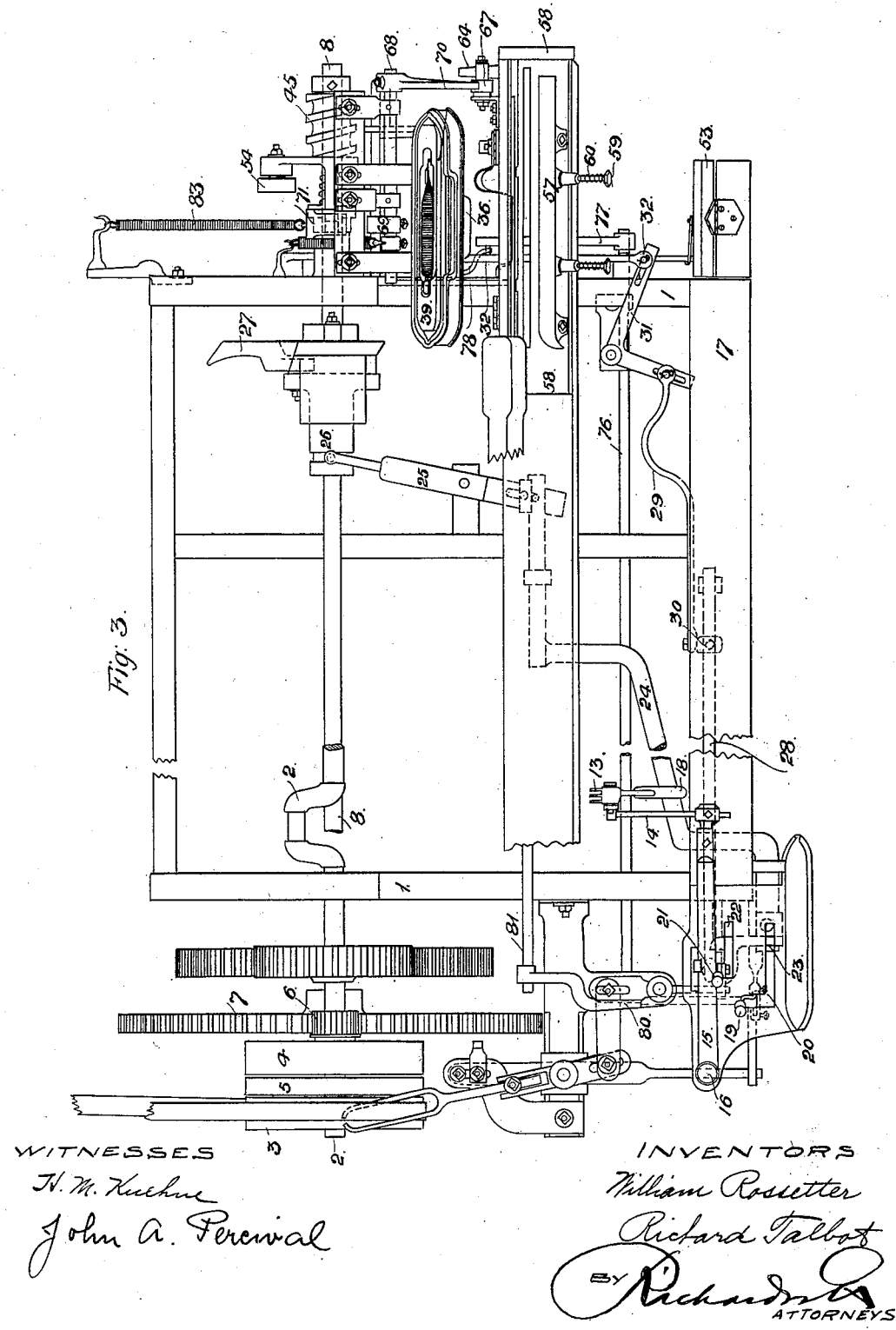

In the accompanying five sheets of drawings, Figure 1 is an end elevation. Fig. 2 is a front elevation; and Fig. 3, a plan view of the main portion of a loom to which our improvements are applied, certain parts being omitted in order that our improved automatic shuttling-motion may be more readily understood. Fig. 4 is a detail view of part of the apparatus. Fig. 5 is a front view of the shuttle-box. Fig. 6 is a plan view; Fig. 7, a similar view to Fig. 5 with the shuttle-guide omitted. Fig. 8 is a back view of Fig. 7; and Fig. 9 is a transverse vertical section on the line A B, Fig. 6, these views being upon an enlarged scale.

In the drawings, 1 denotes the loom-frame; 2, the crank-shaft, upon which is fitted a fast pulley 3 and a loose pulley 4, the latter being mounted upon the boss of a narrow pulley 5, which is fitted loose upon the crank-shaft and placed between the pulleys 3 and 4. Upon the boss of the pulley 5 is fixed a pinion 6 in gear with a large wheel 7, mounted loosely upon the tappet-shaft 8, and upon the end of this shaft is secured a friction-wheel 9, into which a dog-catch 10, pivoted upon a stud 11, secured to the wheel 7, engages a spring 12, bearing upon the dog 10. The weft-fork 13 is carried, as usual, by a rod 14, secured to the weft-fork lever 15, pivoted to a stud 16 on the breast-beam 17, the weft-hammer 18 being moved at every revolution of the tappet-shaft 8 by any of the well-known means. (Not shown.) The ordinary spring-handle 19 is fitted, as usual, in a slot 20, while a second spring-handle 21 is fitted in a similar slot 22, both in the breast-beam, and this handle 21 rests when the loom is in ordinary work against one edge of the weft-fork lever 15, the spring-handles occupying the positions shown in the drawings. Upon the failure of weft the lever 15 is moved by the weft-hammer and forces the handle 21 out of its notch in the slot 22, when the spring in the handle rapidly forces it to the right-hand end of the slot 22, thus moving a bracket 23, secured to an arm 24, which by a pivoted lever 25 slides the picking-arm 26 and picking neb or cam 27, both mounted loosely upon the tappet-shaft 8, out of contact with the picking-bowl, (not shown,) which gives motion to the picking-stick (also not shown) at the opposite side of the loom to the weft-fork and so stops this stick. At the same movement of the weft-hammer 18 a rod 28, pivoted to the spring-handle 21, moves by a bent rod 29, pivoted to an adjustable collar 30 on the rod 28, an elbow-lever 31, pivoted to a stud on the loom-frame, to one end of which lever is pivoted a rod 32, which passes through an upright arm 33, pivoted at the bottom of the frame 34, and two adjustable collars 35 are secured on the rod 32, one on each side of the arm 33, (see Fig. 1,) so that the movement of the rod 32 pushes back the pivoted arm 33 and with it a horizontal pusher-piece 36, connected to it by links 37, and two coiled springs 38, which are strong enough to support the full weight of the reserve shuttles in the magazine 39, and as the arm 33 and piece 36 are moved back the shuttles rest upon a pair of stationary horizontal rods 40, secured in a bracket 41, bolted to the magazine 39. These rods just meet the shuttle-box when the lathe is in its rearmost position. At the same backward movement of the upright arm 33 a projection 42 upon it comes against a stud 43, mounted to slide in a stationary bracket 44, but held forward by a spring. The opposite end of this stud enters when the arm 33 is in its rearmost position a thread in a worm 45, mounted loosely upon the tappet-shaft 8, as clearly shown in Fig. 4. To this worm are secured projections 46 47, which rest in slots in a boss 48, fixed upon the tappet-shaft, by which the worm is caused to rotate and travel along the shaft 8 until the longer projection 47 comes against and moves an arm 49, secured to a pivoted lever 50, held up by a spring 51. The front end of the lever 50 is connected by a rod 52 to a plate 53, hinged to the breast-beam 17. At the same revolution of the worm a bowl 54, carried by it, comes in contact with a striking-plate 55 and moves forward the upright arm 33 as the lathe is traveling backward.

The bottom of the shuttle-box is formed, preferably, of a solid plate 56, and the shuttle-guide 57 on the lathe 58 is of metal and has two bosses formed on it, into which are fitted two studs 59 with heads, and upon these studs are coiled springs 60. The inner ends of the studs are also enlarged and lie flush with the inside of the guide 57. The back of the shuttle-box consists of a plate 61, hinged at 62 to a stationary plate 63 and held in either position, whether open or closed, by a spring 64, bolted to the lathe.

To close the back of the shuttle-box, a bracket 65 is secured to the box, which carries a stud 66, upon which is mounted a bowl 67, and to a short shaft 68, free to be oscillated upon its axis, is secured a small bracket 69 and a finger or striking piece 70. A projection 71 on the upper part of the arm 33 comes against the bracket 69 at certain times and turns the shaft 68, which is returned to its normal position by a coiled spring 72.

The mechanism for knocking off the ordinary spring-handle 19 and stopping the loom when there are no shuttles in the magazine consists of a light vertical rod 73, connected to the upper end of the spring-handle 19. An adjustable bracket 74 is secured to this rod 73, which is connected to an arm 75, pivoted on a shaft 76, that extends across the loom and has secured to it at the other side a weighted arm 77, to which is connected a rod 78, the top of which is T-shaped and lies in contact with the lowest shuttle 79 in the magazine, the weight of a single shuttle being sufficient to hold the parts in the positions shown in Fig. 1—that is to say, with the bracket 74 out of the path of the knocking-off finger 80, on the usual stop-rod 81, carried by the lathe.

Upon the failure of weft the action of the picking-stick is arrested, the vertical arm 33 is forced back in the manner described, and the pusher-piece 36 is withdrawn from under the magazine, so that the reserve shuttles rest upon the horizontal rods 40, the hinged plate 53 is drawn down by the projection 47, pressing down the arm 49, lever 50, and rod 52 opposite to the studs 59 in the shuttle-box, so that when the lathe comes slowly up the studs meet the hinged plate and are pushed back against the shuttle and force it out of its box through the back of the box, which is hinged and kept closed by the spring 64, the spent shuttle falling into a suitable receptacle through a chute 82. At the same revolution of the worm 45 a bowl 54 upon it comes in contact with the striking-plate 55 and moves forward the upright arm 33 as the lathe is traveling toward the magazine 39 of reserve shuttles, the lowest shuttle of which is by the pusher-piece 36 then moved along the horizontal rods 40 through the open back into the shuttle-box. The same forward movement of the vertical arm 33 brings its upper portion 71 against the bracket 69 and turns the shaft 68, which brings the finger 70 against the bowl 67 and shuts down the back 61 of the shuttle-box, which is then held closed by the spring 64 that had previously held it open. The finger 70 in closing the back 61 comes into contact with the pusher-piece 36 and forces it down on its links 37, the springs 38 immediately returning the pusher-piece 36 to its normal position, and as the upright arm continues its forward movement it carries the rod 32 forward, moving the elbow-lever 31 and rods 29 and 28, which force the spring-handle 21 into the notch at the left-hand end of the slot 22, and this movement of the spring-handle 21 draws back the arm 24 and lever 25 and cam 26 into the path of the picking-bowl, which actuates the picking-stick. The movement of the handle 21 has simultaneously shifted the driving-belt from the narrow pulley 5 to the fast pulley 3 and changed the loom from the slow to the ordinary fast speed while the lathe is upon the back centers, and in consequence of the change of speed taking place at this time the loom acquires sufficient speed to give an effective pick to the shuttle. After a new shuttle has been inserted into the shuttle-box by the pusher-piece 36 the upright arm 33 is drawn back into its normal position (see Fig. 1) by a coiled spring 83. In case the magazine 39 should be empty the rod 78, being no longer held down by the weight of a shuttle in the magazine, will rise and move the arms 77 and 75, so as to draw down the rod 73 and bracket 74, which latter comes into the path of the knocking-off finger 80 on the stop-rod 81, and as the lathe comes back the finger 80 meets the bracket, knocks off the spring-handle 19, and stops the loom.

What we claim as our invention, and desire to secure by Letters Patent of the United States, is in the automatic shuttling motion of a loom for weaving—

1. In a loom a shuttle-box having a hinged back, means for ejecting the spent shuttle through said back while the lathe is on its front centers, a shuttle-magazine, and means for tranferring a shuttle therefrom into the same shuttle-box through said open back while the lathe is on its back centers, substantially as described.

2. In a loom the combination with a lathe, of a shuttle-box having a hinged back, shuttle-ejectors carried by the front of the shuttle-box, a movable member on the breast-beam, means whereby on the failure of the weft the movable member is brought into the path of the ejectors and the shuttle ejected on the forward movement of the lathe, a shuttle-magazine, and means whereby a fresh shuttle is inserted in the shuttle-box on the backward movement of the lathe and the movable back closed, substantially as described.

3. In a loom the combination with the lathe, of a shuttle-box having a hinged back, a shuttle-magazine in rear thereof, an upright rocking arm adapted to support the shuttles in the magazine, shuttle-ejectors projecting from the front of the shuttle-box, a movable member adapted to be brought into the path of the shuttle-ejectors whereby they are operated on the forward movement of the lathe, connections between said movable member and the upright arm, and means for moving said upright arm on the failure of the weft, substantially as described.

4. In a loom the combination with the lathe, of a shuttle-box having a hinged back, a shuttle-magazine in rear thereof, an upright rocking arm adapted in its forward position to support the shuttles in said magazine, shuttle-ejectors projecting from the front of the shuttle-box, a movable member, connections whereby on the backward movement of said arm said movable member is brought into the path of the shuttle-ejectors, means operated by the forward movement of the arm for ejecting a fresh shuttle from the magazine into the emptied shuttle-box, and means for operating said arm on the failure of the weft, substantially as described.

5. In a loom the combination with the lathe, of the shuttle-box, means for reducing the speed of the loom on the failure of the weft, means controlled by the failure of the weft for ejecting the shuttle on the forward movement of the lathe, a shuttle-magazine, and means also controlled by the failure of the weft for inserting a fresh shuttle on the backward movement of the lathe, substantially as described.

6. In a loom the combination with the shuttle-magazine, lathe and shuttle-box, of means at the front of the loom coacting with the shuttle-box to eject the spent shuttle, a rocking arm having means for supporting the shuttles in the magazine and for supplying them to the shuttle-box, connections between the shuttle-ejecting means and said arm, means for slowing down the loom and moving said arm backward on the failure of the weft, and means for throwing said arm forward and quickening the movement of the loom, substantially as described.

7. In a loom the combination with the lathe and shuttle-box having an open back, of a shuttle-magazine in rear thereof, a pivoted arm having means for supporting the shuttles in the magazine and ejecting them one at a time, a worm journaled in proximity to said arm, means whereby said arm is moved backward on the failure of the weft, means for ejecting the shuttle from the shuttle-box on the forward movement of the lathe, and means carried by the worm rendered operative by the backward movement of said arm for ejecting the shuttle and then moving said arm forward, substantially as described.

8. In a loom the combination with the lathe and shuttle-box, of shuttle-ejectors carried by the front side of the box, a movable member adapted to be brought into the path of shuttle-ejectors, a shuttle-magazine, a rocking arm, shuttle supporting and transferring means connected therewith, a constantly-rotating and longitudinally-movable worm in proximity to said arm, means for moving said arm backward on failure of the weft, a projection carried by the arm adapted to engage said worm as the arm moves backward whereby the worm is moved lengthwise, connections operated by the worm for moving the movable member to eject the shuttle from the shuttle-box, and means also carried by said worm for moving said arm forward, substantially as described.

9. In a loom the combination with the lathe, shuttle-box, and magazine, and means for transferring shuttles from the magazine to the loom on failure of the weft, a weft-fork controlling the operation of such means, a loom stop mechanism, a rising-and-falling bracket for operating the same, and means controlled by the failure of shuttles in the magazine for operating said bracket, substantially as described.

10. In a loom the combination with the lathe and shuttle-box and the shuttle-magazine, of a drive-shaft having fast and loose pulleys and an intermediate pulley, a drive-belt with means for shifting the same, means for shifting the belt to the intermediate pulley on failure of the weft, slow-speed driving connections between said pulley and the loom, means for ejecting the empty shuttle and supplying a fresh one and for shifting the belt back on the fast pulley, and means for transferring the belt to the loose pulley on the failure of shuttles in the magazine, substantially as described.

11. In a loom the combination with the lathe and shuttle-box and the shuttle-magazine, of a drive-shaft having fast and loose pulleys and an intermediate pulley, a drive-belt with means for shifting the same, means for shifting the belt to the intermediate pulley on failure of the weft, slow-speed friction driving connections between said pulley and the loom, means for ejecting the empty shuttle and supplying a fresh one and for shifting the belt back on the fast pulley, and means for transferring the belt to the loose pulley on the failure of shuttles in the magazine, substantially as described.

In witness whereof we have hereunto set our hands in presence of two witnesses.

WILLIAM ROSSETTER.
RICHARD TALBOT.

Witnesses:
FRED. BOOTHMAN,
EDWIN AINSWORTH.